(12) United States Patent
Verma

(10) Patent No.: US 7,179,403 B2
(45) Date of Patent: *Feb. 20, 2007

(54) ANTI-CORROSION SOLUTIONS FOR AIR DEHUMIDIFICATION SYSTEMS

(75) Inventor: Shyam Kumar Verma, Gastonia, NC (US)

(73) Assignee: FMC Corporation, Philadelphia, PA (US)

( * ) Notice: Subject to any disclaimer, the term of this patent is extended or adjusted under 35 U.S.C. 154(b) by 456 days.

This patent is subject to a terminal disclaimer.

(21) Appl. No.: 10/301,438

(22) Filed: Nov. 21, 2002

(65) Prior Publication Data

US 2003/0098441 A1   May 29, 2003

Related U.S. Application Data

(63) Continuation of application No. 09/362,260, filed on Jul. 28, 1999, now Pat. No. 6,503,420, which is a continuation-in-part of application No. 08/944,728, filed on Oct. 6, 1997, now Pat. No. 6,024,892.

(60) Provisional application No. 60/132,931, filed on May 6, 1999.

(51) Int. Cl.
*C09K 5/00* (2006.01)

(52) U.S. Cl. .................................. 252/389.2; 252/387

(58) Field of Classification Search ............... 252/364, 252/389.2, 387; 422/7, 14, 15
See application file for complete search history.

(56) References Cited

U.S. PATENT DOCUMENTS

| | | | |
|---|---|---|---|
| 3,214,454 A | 10/1965 | Blaser et al. | |
| 3,278,446 A | 10/1966 | Irani | |
| 3,336,221 A | 8/1967 | Ralston | |
| 3,366,675 A | 1/1968 | Dyer | |
| 3,541,013 A | 11/1970 | Macriss et al. | 252/69 |
| 3,723,347 A | 3/1973 | Michell | 252/389 |
| 3,959,360 A | 5/1976 | Vazopolos | |
| 4,026,815 A * | 5/1977 | Kallfass et al. | 252/180 |
| 4,052,160 A | 10/1977 | Cook et al. | 422/15 |
| 4,089,650 A | 5/1978 | Redmore | |
| 4,209,487 A | 6/1980 | Hogue et al. | 422/12 |
| 4,311,024 A | 1/1982 | Itoh et al. | 62/474 |
| 4,600,524 A | 7/1986 | Cuisia et al. | 252/181 |
| 4,631,131 A | 12/1986 | Cuisia et al. | 210/697 |
| 4,689,200 A | 8/1987 | Cook et al. | |
| 4,778,655 A | 10/1988 | Greaves | 422/15 |
| 4,798,675 A | 1/1989 | Lipinski et al. | 210/700 |
| 5,126,108 A | 6/1992 | Leighton et al. | 422/15 |
| 5,259,985 A | 11/1993 | Nakanishi et al. | 252/180 |
| 5,292,455 A * | 3/1994 | Zefferi et al. | 252/389.23 |
| 5,603,840 A | 2/1997 | Strittmatter et al. | 210/698 |
| 5,606,105 A | 2/1997 | Davis et al. | 562/8 |
| 5,846,450 A | 12/1998 | Atkinson et al. | 252/69 |
| 5,964,928 A * | 10/1999 | Tomlinson | 106/14.21 |
| 6,001,264 A * | 12/1999 | Suzuki et al. | 210/697 |
| 6,004,475 A | 12/1999 | Verma et al. | 252/69 |
| 6,004,476 A * | 12/1999 | Verma et al. | 252/69 |
| 6,024,892 A * | 2/2000 | Verma et al. | 252/194 |
| 6,503,420 B1 * | 1/2003 | Verma | 252/194 |

FOREIGN PATENT DOCUMENTS

| | | |
|---|---|---|
| EP | 0807695 | 11/1997 |
| FR | 2505861 | 11/1982 |
| SU | 1540330 | 12/1991 |
| WO | WO 9309198 | 5/1993 |
| WO | WO 9749842 | 12/1997 |

OTHER PUBLICATIONS

Patent Abstracts of Japan vol. 1998, No. 02, Jan. 30, 1998 & JP 09280683 A (Nippon Chem Ind Co Ltd), Oct. 31, 1997.
Patent Abstracts of Japan vol. 003, No. 023 (C-038), Feb. 26, 1979 & JP 53 146942 A (Nippon Chem Ind Co Ltd; others: 01); Dec. 21, 1978.
Rajendran, S., et al. "Analysis of protective film formed on surface of mild steel immersed i chloride—HEDP—molybdate—$Zn^{2+}$ environment" *Anti-Corrosion Metods and Materials* 45(6):397-402 (1998).

* cited by examiner

*Primary Examiner*—Jill Warden
(74) *Attorney, Agent, or Firm*—Myers Bigel Sibley & Sajovec, PA

(57) ABSTRACT

Anti-corrosion solutions useful for air dehumidification processes are disclosed. Phosphonate corrosion inhibiting agents or mixtures thereof can be added to halide solutions of alkali metals, alkaline earth metals, or mixtures thereof, to minimize corrosion of the dehumidifier system.

9 Claims, No Drawings

ANTI-CORROSION SOLUTIONS FOR AIR DEHUMIDIFICATION SYSTEMS

CROSS-REFERENCE TO RELATED APPLICATIONS

This application is a continuation application of and claims priority from U.S. patent application Ser. No. 09/362,260, filed Jul. 28, 1999, which issued as U.S. Pat. No. 6,503,420 on Jan. 7, 2003, the disclosure of which is incorporated herein by reference in its entirety, and which is a continuation-in-part of U.S. patent application Ser. No. 08/944,728, filed on Oct. 6, 1997, which issued as U.S. Pat. No. 6,024,892, and U.S. Provisional Patent Application 60/132,931, filed May 6, 1999, the disclosure of which is incorporated herein by reference in its entirety.

FIELD OF THE INVENTION

This invention relates generally to anti-corrosion solutions for air dehumidification systems, and in particular to air dehumidification solutions which include a phosphonate anti-corrosion agent.

BACKGROUND OF THE INVENTION

Alkali metal halide solutions and similar solutions, such as calcium chloride solutions, or their mixtures, are widely used in dehumidification processes and systems. In a typical air dehumidification system, humidified air to be conditioned is directed into a cooling system. The humidified air initially enters an air conditioning region where the air is cooled and then contacted with an absorbent solution of alkali metal halide, such as lithium chloride, alkaline earth metal halide, such as calcium chloride, or mixtures thereof. The absorbent solution removes water vapor from humidified stream of air by chemical absorption to provide an air stream with the desired relative humidity. Diluted solution is then routed to a regeneration region where the diluted solution is concentrated and thereafter directed back to the air conditioning region of the system.

Under poor environmental conditions, contaminants, such as carbon dioxide, sulfur oxide compounds ($SO_x$), nitric oxides ($NO_x$) or acidic vapors, can be present in the air stream to be treated. These conditions can adversely affect, that is reduce the pH of the absorbent solution, resulting in an acidic solution. Under acidic conditions, the absorbent solution becomes increasingly corrosive towards the metallic materials of the machine, such as carbon steel which is used to construct dehumidification equipment.

In current practice in the industry, molybdate, chromate or silicate anions or their salts are used as corrosion inhibiting additives. Because the dehumidification systems are open systems, new environmentally friendly and improved corrosion inhibitors are in demand for these systems. Use of chromate is limited due to environmental concerns. While more environmentally acceptable, simple alkali metal molybdate salts have limited solubility in aerated solutions. Silicates also exhibit limited solubility in this solution.

SUMMARY OF THE INVENTION

The present invention provides absorbent solutions which include one or more phosphonate corrosion inhibiting agents useful for air dehumidification applications. The solutions can offer comparable or improved anti-corrosion protection as compared to conventionally used corrosion inhibitors during repeated dehumidification cycles in closed or open systems. In addition, the solutions of the invention can be more environmentally acceptable. Still further, the phosphonates can be used in relatively small quantities, typically ranging from about 0.0005 to about 0.20 percent by weight and still provide high levels of corrosion protection even for dehumidification solutions having high concentrations of halide.

The solutions of the invention can also include one or more buffering agents to provide pH stable absorbent solutions useful for air dehumidification applications. The absorbent solutions can include inorganic buffers, such as boron-containing buffering agents. The absorbent solutions alternatively can include organic biological buffers, such as amino polyols and/or organic sulfonic acid buffering agents. The absorbent solutions can also include mixtures of the inorganic and/or organic buffering agents. The resultant solutions can exhibit stabilized pH through repeated fluid dehumidification cycles, even for fluid streams contaminated with carbon dioxide, sulfur oxide compounds ($SO_x$), nitric oxides ($NO_x$), acidic vapors, and the like.

DETAILED DESCRIPTION OF THE PREFERRED EMBODIMENTS

The present invention will be described more fully hereinafter in connection with illustrative embodiments of the invention which are given so that the present disclosure will be thorough and complete and will fully convey the scope of the invention to those skilled in the art. However, it is to be understood that this invention may be embodied in many different forms and should not be construed as being limited to the specific embodiments described and illustrated herein. Although specific terms are used in the following description, these terms are merely for purposes of illustration and are not intended to define or limit the scope of the invention.

Exemplary phosphonate corrosion inhibiting agents include without limitation phosphonocarboxylic acids, aminophosphonates, acylation products of phosphorous acid, phosphonoacetic acids, and the like and mixtures thereof.

Exemplary phosphonocarboxylic acids include, for example, compounds of the formula

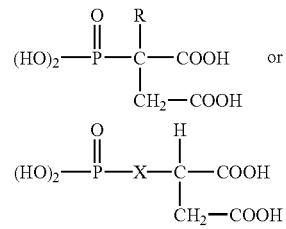

in which:

R is hydrogen, alkyl, alkenyl, or alkinyl radical having up to 4 carbon atoms, aryl, cycloalkyl or aralkyl radical or the radicals

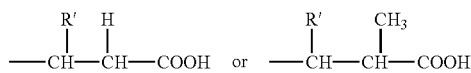

R' is hydrogen, alkyl radical having up to four carbon atoms or carboxyl radical; and X is

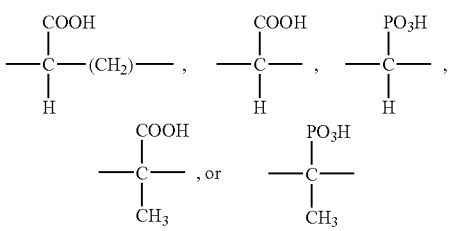

Suitable phosphonocarboxylic acids include without limitation α-methylphosphonosuccinic, phosphonosuccinic acid, 1-phosphonopropane-2,3-dicarboxylic acid, 2-phosphonobutane-1,2,4-tricarboxylic acid, α-allyl-phosphonosuccinic acid, α-p-chlorophenyl-phosphonosuccinic acid, α-propargyl-phosphonosuccinic acid, α-benzyl-phosphonosuccinic acid, α-cyclohexyl-phosphonosuccinic acid, 2-phosphono-3-(α-methyl-carboxymethyl)-hexane-1,2,4-tricarboxylic acid, 2,2-diphosphono-butane-3,4-dicarboxylic acid, and the like and mixtures thereof.

Exemplary aminophosphonates include, for example, compounds having a methyl phosphonic acid or alkali metal or ammonium salt thereof bonded to a nitrogen atom. Such compounds can be generally described by the formula

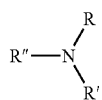

wherein:
R is

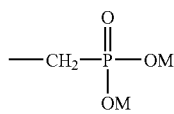

R' is R or —CH$_2$CH$_2$OH; and
R" is R, —CH$_2$CH$_2$OH or

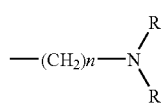

wherein M is hydrogen, NH$_4$, alkali metal, or a combination thereof and n is 1, 2 or 3.

Other exemplary aminophosphates include without limitation amino tri(lower alkyidenephosphonic acids) or their water soluble salts, as defined by the formula

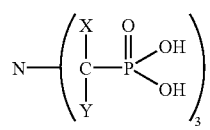

wherein X and Y represent hydrogen or lower alkyl having 1 to 4 carbon atoms. Illustrative compounds include amino tri(methylphosphonic acid) N(CH$_2$P(O)(OH)$_2$)$_3$; amino(triethylidenephosphonic acid) (N((CH$_3$)CHP(O)(OH)$_2$)$_3$; amino tri(isopropylidenephosphonic acid) (N((CH$_3$)(CH$_3$)CP(O)(OH)$_2$)$_3$, and the like and mixtures thereof.

Exemplary acylation products of phosphorous acid include, for example, compounds of the formula

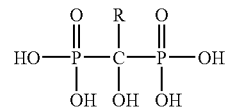

wherein R is alkyl having 1 to 5 carbon atoms; alkali metal, ammonium and ethanolamine salts thereof; and mono- and dialkyl esters thereof with methanol, ethanol, propanol or butanol.

Exemplary phosphonates include, but are not limited to, 2-hydroxy-phosphonoacetic acid (HPA), tris-amino phosphonic acid (AMP), 1,1-hydroxyethylidine diphosphonic acid (HEDP), ethylene diamine tetra-methylenephosphonic acid (ENTP), hexamethylene diamine tetra-methylenephosphonic acid (HMTP), diethylene triamine penta-methylenephosphonic acid, 2-phosphono-1,2,4-butanetricarboxylic acid (PBTC), and the like, and mixtures thereof.

These and other phosphonates are well known in the art and are described in U.S. Pat. Nos. 3,214,454; 3,278,446; 3,336,221; 4,026,815; 3,959,360; 3,366,675; and 4,689,200, the entire disclosure of each of which is hereby incorporated by reference. The phosphonates can be present in an amount from about 0.0005 to about 0.20 percent by weight, preferably about 0.0025 to about 0.050 percent by weight, based on the total weight of the solution.

The phosphonate corrosion inhibiting agents are added to absorbent solutions which include at least one alkali metal halide, such as lithium chloride, alkaline earth metal halide, such as calcium chloride, or a mixture thereof, in conventional amounts. An exemplary alkali metal halide solution includes alkali metal halide in an amount from about 10 to about 45 weight percent, preferably about 20 to about 40 weight percent, based on the total weight of the solution.

Advantageously the solution further includes at least one buffering agent to stabilize pH of the dehumidification solution through repeated fluid dehumidification cycles, even for fluid streams contaminated with carbon dioxide, sulfur oxide compounds (SO$_x$), nitric oxides (NO$_x$), acidic vapors, and the like. The absorbent solutions can include inorganic buffers, such as boron-containing buffering agents. The absorbent solutions alternatively can include organic biological buffers, such as amino polyols and/or organic sulfonic acid buffering agents. The absorbent solutions can also include mixtures of the inorganic and/or organic buffering agents.

The boron-containing inorganic buffering agent is selected from boron-containing compounds capable of providing boron ions in the absorbent solution. Exemplary boron-containing inorganic buffering agents include, but are not limited to, lithium tetraborate and metaborate, sodium and potassium borates, boric acid, and the like, and mixtures thereof.

Exemplary amino polyols include, but are not limited to, C$_1$ to C$_3$ linear or branched amino polyols, in which one or more carbon atoms thereof can include C$_1$ to C$_6$ alkyl substituents, which substituents in turn can further include one or more hydroxy and/or amino groups. Exemplary amino polyols include, but are not limited to, amino methyl propane, amino methyl propanol, mixtures thereof and the like.

Exemplary organic sulfonic acid buffering agents include, but are not limited to, compounds of the formula R—SO$_3$H, wherein R can be C$_1$ to C$_{10}$ linear, branched or cyclic alkyl substituents, which substituents can include one or more hydroxyl and/or amino groups and/or C$_5$ to C$_{10}$ heterocyclic rings containing O and/or N atoms. Exemplary organic sulfonic acids include, but are not limited to, amino propane sulfonic acid, the buffers Tris, Bis-tris and Bis-tris propane, commercially available for example from ICN Pharmaceuticals, as well as mixtures thereof and the like.

Mixtures of inorganic and organic buffers as described herein can also be used.

The inorganic buffering agent can be present in an amount sufficient to provide boron in solution in amounts ranging from about 0.03 to about 1.0 percent by weight, preferably about 0.03 to about 0.3 percent by weight, based on the total weight of the solution. The organic buffering agent can be present in amounts ranging from about 0.7 to about 10.0 percent by weight, preferably about 0.7 to about 5.0 percent by weight, also based on the total weight of the solution. Such solutions can provide substantial buffering capacity and also provide some corrosion resistance, for example for carbon steel at absorbent solution temperatures of up to about 300° F. under aerated conditions. Thus despite the presence of contaminates such as carbon dioxide, sulfur dioxide, nitric oxide, acidic vapors, and the like, the solutions are capable of stabilizing the pH thereof, for example from about 7 to about 9.5, through repeated fluid dehumidification cycles.

The solutions of the invention can also include other corrosion inhibitors that are commonly used in the industry, such as, but not limited to, alkali metal salts of molybdate, chromate and silicate anions, and mixtures thereof, although such agents are not required. The solutions can also include other corrosion inhibiting agents such as heteropoly complex anions of transition metal elements, preferably phosphomolybdates, as described, for example, in PCT Publication WO 97/49842, the entire disclosure of which is hereby incorporated by reference.

The heteropoly complex anions of transition metal elements useful in the invention can be generally described as coordination-type salts and free acids with a complex and high molecular weight anion. The heteropoly complex anions include as a ligand or complexing agent at least one transition metal atom which, as an ion in solution, exhibits corrosion inhibiting properties. The heteropoly complex anions useful in the invention also are preferably substantially completely soluble in alkali metal halide solutions, such as lithium chloride solutions, so as to maximize the concentration of the corrosion inhibiting ions in solution. The heteropoly anions contain complexed transition metal atoms (such as Mo). Therefore, the dissolved heteropoly anions can provide a higher level of transition metal anion (Mo anion) in a solution, as compared to simple transition metal oxides, such as molybdates like lithium molybdate.

Such complexes can be generally represented by the following formulas:

$[X_aM_bO_c]^{-n}$, $[X_aZ_dM_bO_c]^{-n}$, $[X_aZ_dM_bO_cH_e]^{-n}$, $[X_aM_bO_c(OH)_f]^{-n}$, and $[X_aZ_dM_bO_c(OH)_f]^{-n}$, wherein:

X and Z are central heteroatoms from Groups I–VIII of the Periodic Table of Elements;

the value of a varies and is 1 or 2;

the value of d varies and is an integer from 0 to 4;

$M_bO_c$, $M_bO_cH_e$, and $M_bO_c(OH)_f$ are oxoanions in which M is a transition metal element; the value of b varies, depending upon the number of transition metal atoms present in the oxoanion and can be an integer from 5 to 22, preferably 6 to 12; the value of c varies, depending upon the number of oxygen atoms present in the oxoanion attached to the transition metal and also capable of forming unique structural groups with the central atoms, and is an integer from 20 to 70, preferably from 24 to 40; the value of e varies (for example in the reduced heteropolyanion, the value of e varies depending upon the reduction of the heteropolyanion) and is an integer from 0 to 6; and the value of f varies and is an integer from 0 to 3; and n is the charge of the anion and is the sum of the charges on X, Z, M, O, H, and OH.

Although the above formulas are general representations of the heteropoly complex anions useful in the invention, as will be appreciated by the skilled artisan, other compounds can also be included. Also as these formulas represent, in some heteropoly complex anions, H atoms in addition to the O atoms have been reported. Any of the various heteropoly complex anions known in the art can be used in the invention, including compounds described by G. A. Tsigdinos, Topics Curr. Chem., vol. 76, 5–64 (1978) and D. L. Kepert, Comprehensive Inorganic Chemistry (A. F. Trofman et al.) Oxford:Pergamon Press, vol. 4, pp. 607 (1973), the entire disclosure of each of which is incorporated herein by reference.

With regard to the central or heteroatom X, over 40 different elements (both metals and nonmetals) from Periodic Groups I–VIII can function as central atoms in distinct heteropoly complex anions. For example, X can be an elements selected from Groups IVB, VB, VIB, VIIB, VIII, IB, IIB, IIIA, IVA, and VA of the Periodic Table of Elements. Exemplary central atoms include, but are not limited to, ions of phosphorus, silicon, manganese, arsenic, boron, iron, tellurium, copper, zinc, aluminum, tin, zirconium, titanium, vanadium, antimony, bismuth, chromium, gallium, germanium, and the like.

M is a 2–18 hexavalent transition metal element atom, which surrounds one or more central atoms X. The transition metal atom M is selected from those elements which as ions in solution provide corrosion inhibiting effect in absorption refrigeration systems. Preferably the transition metal element M in the oxoanion is derived from molybdate or tungstate. Other transition metal elements can also be present, as represented in the formula as Z, such as but not limited to, an element selected from Groups IVB, VB, VIB, VIIB, VIII, IB, IIB, IIIA, IVA, and VA of the Periodic Table of Elements. Exemplary elements include without limitation manganese, cobalt, nickel, copper, zinc, vanadium, niobium, tantalum, gallium, germanium, arsenic, antimony, bismuth, tellurium, and the like and other transition elements.

Exemplary heteropoly complex anions include, but are not limited to, phosphomolybdates, such as but not limited to, $[PMo_{12}O_{40}]^{-3}$, wherein $P^{+5}$ is the central atom or heteroatom, $[PMo_{10}V_2O_{40}]^{-5}$ and the like; silicon molybdates, such as but not limited to, $[SiMo_{11}NiO_{40}H_2]^{-6}$, wherein $Si^{+4}$ is the central atom; manganese molybdates, such as but not limited to, $[MnMo_9O_{32}]^{-6}$, wherein $Mn^{+4}$ is the central atom; silicon tungstates, such as but not limited to, $[SiW_{12}O_{40}]^{-4}$, wherein $Si^{+4}$ is the central atom; tellurium molybdates, such as but not limited to, $[TeMo_6O_{24}]^{-6}$, wherein $Te^{+6}$ is the central atom; arsenic molybdates, such as but not limited to, $[As_2Mo_{18}O_{62}]^{-6}$, wherein $As^{+5}$ is the central atom; manganese niobiates, such as but not limited to, $[MnNb12O_{36}]^{-12}$, wherein $Mn^{+4}$ is the central atom; and the like, and mixtures thereof. Currently preferred heteropoly complex anions are phosphomolybdates.

The heteropoly complex anions which have been structurally characterized can be divided into the broad groups, depending upon the heteroatom [X], transition metal atom [M] stoichiometry, and upon the coordination number of the heteroatom (that is, the number of points at which M is attached to the heteroatom in the complex). The heteropoly complex anions can be classified according to the ratio of the number of the central atoms to the peripheral molybdenum or other such atoms. For example, the different types of known heteropoly complex anions of molybdate show the following X:M ratio with one or more central atoms: X:M=1:12, 1:11, 1:10, 1:9, 1:6, 2:10, 2:17, 2:5, 4:12, 1m:6m (m unknown) and 1:1 heteropoly complex anions. The known tungstates include all of the above in addition to 2:18, 2:17 and 2:4:18.

Such complexes can be present in an amount from about 0.02 to about 0.3 percent by weight, preferably about 0.05 to about 0.2 percent by weight, based on the total weight of the solution.

The present invention will be further illustrated by the following non-limiting examples.

EXAMPLE 1

Corrosion tests were run on carbon steel coupons with lithium chloride solutions containing $Li_2MoO_4$ as a corrosion inhibiting agent, with and without buffer. Corrosion tests were also run on lithium chloride solutions which included HEDP (commercially available) and lithium chloride solutions with $Li_2MoO_4$, without buffer and with buffer. The tests resulted generally in lower corrosion rates for HEDP or the combination of HEDP with buffer than that observed in the presence of lithium chloride or lithium chloride containing lithium molybdate solutions. These additives provide additional protection for metal against the corrosive attack of the brine solution. The results are set forth below in Tables 1 and 2.

TABLE 1

Corrosion Rate of Carbon Steel in
25 wt. % LiCl Solution
(110° F., Aerated, Ambient Pressure)

| Additive | Corrosion Rate (mils per year)* |
|---|---|
| None | 10.6 |
| $Li_2MoO_4$ (250 ppm) | 5.2 |
| HEDP (100 ppm) | 0.6 |
| HEDP (100 ppm) and Buffer** | 0.65 |
| HEDP (50 ppm) + $Li_2MoO_4$ (295 ppm) + Buffer** | 3.0 |

*= 30 days
**= B = 0.2 percent

TABLE 2

Corrosion Rate of Carbon Steel in
25 wt.% LiCl Solution
(110° F., Aerated, Ambient Pressure)

| Additive | Corrosion Rate (mils per year)* |
|---|---|
| None | 10.6 |
| $Li_2MoO_4$ (250 ppm) | 5.2 |
| PBTC (200 ppm) and Buffer** | 2.6 |

*= 30 days
**= B = 0.2 percent

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An absorbent solution comprising at least one halide of an alkali metal, an alkaline earth metal, or a mixture thereof in an amount ranging from about 10 to about 45 weight percent, at least one phosphonate corrosion inhibiting agent selected from the group consisting of phosophonocarboxylic acids, aminophosphonates, acylation products of phosphorous acid, and mixtures thereof, and at least one organic buffering agent or a mixture thereof capable of stabilizing the pH of said solution during repeated dehumidification cycles.

2. The solution of claim 1, wherein said absorbent solution further comprises an inorganic buffering agent.

3. The solution of claim 2, wherein said absorbent solution further comprises an inorganic buffering agent.

4. The solution of claim 1, wherein said aminophosphonate comprises a compound selected from the group consisting of tris-amino phosphonic acid (AMP), ethylene diamine tetra-methylenephosphonic acid (ENTP), hexamethylene diamine tetra-methylenephosphonic acid (HMTP), diethylene triamine penta-methylenephosphonic acid, and mixtures thereof.

5. The solution of claim 1, wherein said organic buffering agent is selected from the group consisting of amino polyols, organic sulfonic acids, and mixtures thereof.

6. The solution of claim 5, wherein said organic buffering agent is selected from the group consisting of amino methyl propane, amino propane sulfonic acid, amino methyl propanol, Tris-, Bis-Tris, Bis-Tris propane and mixtures thereof.

7. The solution of claim 1, wherein said organic buffering agent is selected from the group consisting of Tris, Bis-Tris, Bis-Tris propane, and mixtures thereof.

8. The solution of claim 1, wherein said solution comprises organic buffering agent in an amount from about 0.7 to about 10.0 percent by weight based on the total weight of the solution.

9. The solution of claim 8, wherein said solution comprises organic buffering agent in an amount from about 0.7 to about 5 percent by weight based on the total weight of the solution.

* * * * *